United States Patent
Tamura (10) Patent No.: US 7,933,362 B2
(45) Date of Patent: Apr. 26, 2011

(54) MULTILEVEL QAM SYMBOL TIMING DETECTOR AND MULTILEVEL QAM COMMUNICATION SIGNAL RECEIVER

(75) Inventor: Shinji Tamura, Nishinomiya (JP)

(73) Assignee: Furuno Electric Company Limited, Nishinomiya-shi (JP)

( * ) Notice: Subject to any disclaimer, the term of this patent is extended or adjusted under 35 U.S.C. 154(b) by 979 days.

(21) Appl. No.: 11/792,571

(22) PCT Filed: Dec. 5, 2005

(86) PCT No.: PCT/JP2005/022277
§ 371 (c)(1),
(2), (4) Date: Jun. 7, 2007

(87) PCT Pub. No.: WO2006/062050
PCT Pub. Date: Jun. 15, 2006

(65) Prior Publication Data
US 2008/0075192 A1    Mar. 27, 2008

(30) Foreign Application Priority Data
Dec. 7, 2004  (JP) ................................ 2004-354375

(51) Int. Cl.
*H04L 25/49*    (2006.01)
(52) U.S. Cl. ................. 375/324; 375/326; 375/293
(58) Field of Classification Search ........... 375/293, 375/355, 324, 326, 327, 354, 316, 376, 373
See application file for complete search history.

(56) References Cited

U.S. PATENT DOCUMENTS 5,598,439 A * 1/1997 Wagner ................ 375/326
(Continued)

FOREIGN PATENT DOCUMENTS
JP    07-321867 A    12/1995
(Continued)

OTHER PUBLICATIONS

Dimitrios Efstathiou and A. Hammid Aghvami,"Preamble-Less Nondecision-Aided (NDA) Feedforward Synchronization Techniques for 16-QAM TDMA Demodulators", May 1998, IEEE.*
(Continued)

*Primary Examiner* — Chieh M Fan
*Assistant Examiner* — Aristocratis Fotakis
(74) *Attorney, Agent, or Firm* — Nutter McClennen & Fish LLP; John J. Penny, Jr.; Christina M. Sperry (57) ABSTRACT

A multilevel symbol timing signal detector is provided, which is used for reliably detecting the symbol timing of a multilevel QAM signal. When an oversampling I signal is inputted to I-Signal Histogram Generator 610, the signal is subjected to 1-symbol length buffering by computing absolute values. Sampling times corresponding to an oversampling frequency and amplitude data for these times are extracted from the buffered data and the amplitude data is buffered for each sampling time over predetermined intervals. Histograms of the amplitude data for each sampling time are generated based on these buffered amplitude data. Symbol timing is acquired by detecting a sampling time corresponding to the amplitude data with the highest frequency of detection based on the histograms of amplitude data.

4 Claims, 4 Drawing Sheets

U.S. PATENT DOCUMENTS

| | | | |
|---|---|---|---|
| 6,477,215 B1* | 11/2002 | Temerinac | 375/355 |
| 6,731,697 B1* | 5/2004 | Boccuzzi et al. | 375/326 |
| 2002/0051487 A1* | 5/2002 | Yamada et al. | 375/232 |
| 2003/0095617 A1* | 5/2003 | Lee et al. | 375/354 |
| 2003/0161393 A1* | 8/2003 | Ahn | 375/224 |
| 2005/0018792 A1* | 1/2005 | Singh | 375/340 |
| 2005/0286619 A1* | 12/2005 | Haddadin et al. | 375/222 |

FOREIGN PATENT DOCUMENTS

| | | |
|---|---|---|
| JP | 11-112589 | 4/1999 |
| JP | 11-284676 | 10/1999 |
| JP | 2001-24562 | 1/2001 |
| JP | 2001-24563 | 1/2001 |
| JP | 2002-84267 | 3/2002 |
| JP | 2003-309613 | 10/2003 |
| JP | 2004-201077 | 7/2004 |

OTHER PUBLICATIONS

J. H. Grimm, R. N. Kumar, J. Kusuma, and J. V. Krogmeier, "Real Time Implementation of a Symbol Timing Recovery Algorithm for a Narrowband Wireless Modem" School of Electrical and Computer Engineering, Purdue University, 1998 IEEE.*

International Search Report dated Feb. 7, 2006.

* cited by examiner

MULTILEVEL QAM SYMBOL TIMING DETECTOR AND MULTILEVEL QAM COMMUNICATION SIGNAL RECEIVER

CROSS REFERENCE OF RELATED APPLICATION

PCT Application PCT/JP2005/022277 and Japanese Patent Application Tokugan No. 2004-354375 are hereby incorporated by reference.

TECHNICAL FIELD

This invention relates to a multilevel QAM symbol timing detector for detecting the symbol timing of a multilevel QAM communication signal for communicating information via amplitude/phase modulation, and to a multilevel QAM communication signal receiver including the same.

BACKGROUND ART

In digital communications intended for information transmission, various modulation methods have been utilized for transmitting large quantities of information at higher speeds while using the same power. The minimum unit used for transmitting this information is a symbol, and a communication frame is composed of a plurality of such symbols arranged in chronological order. The greater the amount of information transmittable by a single symbol, the greater the amount of information that can be transmitted over a predetermined time throughout the entire communications system. For instance, 4-bit information is provided by 1 symbol in a 16-level QAM modulation type signal (hereinafter referred to as a "16-QAM communication signal"). In addition, in a QAM modulation system, depending on the amplitude and phase settings that can be used, there also exist multilevel QAM communication signals other than the 16-level QAM communication signal.

In such a multilevel QAM communication signal, in order to detect symbol timing in a communication frame, a unique word UW is inserted at the beginning and, furthermore, a pilot symbol PS is inserted every predetermined number of symbols. For example, in the 16-QAM communication signal used by Inmarsat, a 40-symbol unique word UW is inserted at the beginning and a single-symbol pilot symbol PS is inserted every 29 symbols. These unique words UW and pilot symbols PS are preset signals and, in order to facilitate detection of symbol timing, they are typically set up as signals that look like BPSK signals.

However, in methods that involve detection of unique words UW and pilot symbols PS in this manner, the accuracy of symbol timing detection decreases when the unique word UW is short and a large number of samples is required for increasing the symbol timing detection timing to a predetermined accuracy when Eb/No is low. For this reason, symbol timing either cannot be detected or, even if it is detected, it may not be possible to detect it frequently.

As a method of overcoming this problem, Patent Document 1 and Patent Document 2 disclosed symbol synchronization devices, in which a reference signal corresponding to a symbol timing signal is produced in a receiver and this signal is compared with a received multilevel QAM communication signal to detect symbol timing. In addition, Patent Document 3 disclosed a detection method, in which a predetermined threshold value is set up in advance, the amplitude of a received signal is observed chronologically while comparing it with the above-mentioned threshold value, and the times, at which a chronological characteristic curve of the amplitude crosses a line representative of the threshold value, is used as the symbol timing.

[Patent Document 1] JP 2001-24562A
[Patent Document 2] JP 2001-24563A
[Patent Document 3] JP 2003-309613A

DISCLOSURE OF INVENTION

Problem to be Solved by the Invention

However, in the symbol synchronization devices described in Patent Document 1 and Patent Document 2, a reference signal corresponding to a symbol timing signal, and, accordingly, means for producing such a reference signal, are required in the receiver. This adds complexity to the configuration and processing of the symbol timing detector. Furthermore, in the symbol timing detection method described in Patent Document 3, the threshold value has to be set in advance, and it is either impossible to detect symbol timing, or a misdetection occurs if the threshold value setting is not appropriate. Although there is a preventative method, in which the threshold value is rendered variable, the method requires a unique word UW and pilot symbols PS, so that, after all, a unique word UW and pilot symbols PS have to be used. As a result, as described above, either time is required for setting the threshold value, or threshold value setting becomes more difficult.

Therefore, it is an object of the present invention to provide a multilevel QAM symbol timing detector capable of detecting symbol timing using a received multilevel QAM communication signal alone without using a unique word UW and pilot symbols PS, or without using a preset reference signal or a threshold value. In addition, it is also to design a multilevel QAM communication signal receiver utilizing the multilevel QAM symbol timing detector.

Means for Solving Problem

The present invention is a multilevel QAM symbol timing detector for detecting the symbol timing of a multilevel QAM communication signal, comprising: sampling point amplitude detectors for buffering the amplitude data of a multilevel QAM communication signal detected using an oversampling frequency with a predetermined factor in 1-symbol period units and detecting amplitude data for each sampling time corresponding to the oversampling frequency; sampling timing-dedicated amplitude data buffers for buffering respective amplitude data corresponding to each sampling time within the 1-symbol period over predetermined intervals; amplitude histogram generators for generating histograms of amplitude data within the predetermined intervals, stored in each of the sampling timing-dedicated amplitude data buffers; and a symbol timing detector for detecting, as symbol timing, a sampling time corresponding to the amplitude data with the highest detection frequency based on the results of the amplitude histogram generators.

In addition, the inventive multilevel QAM symbol timing detector comprises absolute value operators for producing an absolute value signal by computing absolute values for a multilevel QAM communication signal detected using an oversampling frequency with a predetermined factor and the sampling point amplitude detectors detect amplitude data using the absolute value signal of the multilevel QAM communication signal.

In these arrangements, amplitude data corresponding to each sampling time in a multilevel QAM communication signal detected using an oversampling frequency with a predetermined factor is detected and buffered in 1-symbol length units along with the sampling times. At such time, sampling may be carried out using the absolute value signal obtained by computing absolute values for the multilevel QAM communication signal detected using an oversampling frequency with a predetermined factor, with the number of samples increased when using the absolute value signal. The amplitude data contained in a 1-symbol length unit is subjected to buffering for a predetermined number of symbols for every corresponding sampling time and a histogram of the buffered amplitude data is generated for every symbol timing.

Figure 4:
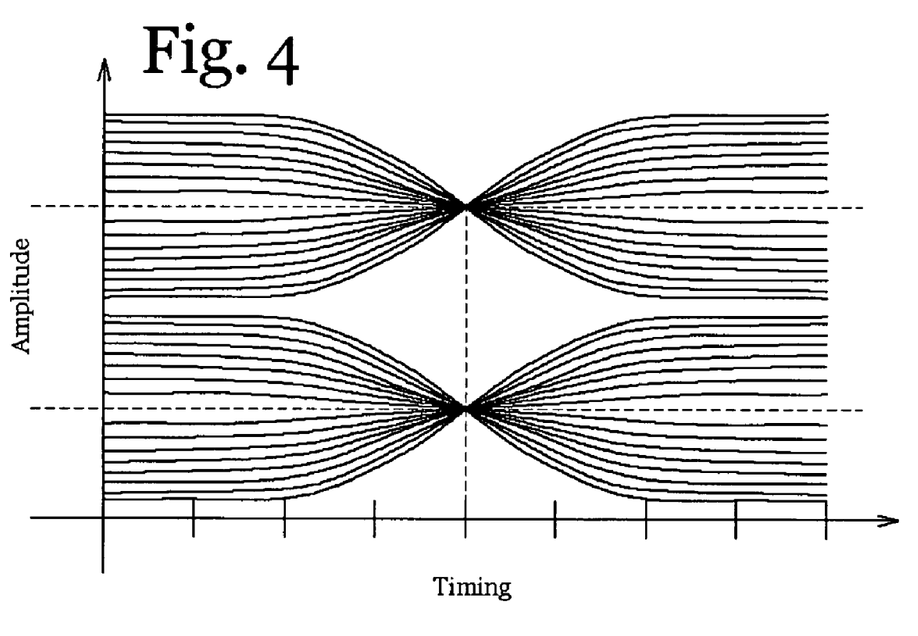
FIG. 4 is a schematic diagram of the eye pattern of an absolute value signal of a 16-QAM communication signal.

Here, in case of a de-noised QAM communication signal (an amplitude-modulated and phase-modulated digital communication signal, not limited to QAM communication signals), for any symbol sequence, symbol timing is typically revealed at the same amplitude, and, therefore, among the one-symbol-length sampling times constituting the above-described histogram, there should be a time with a high frequency of detection of the same amplitude. It is also appreciated that, as shown in FIG. 4, the eye pattern of the QAM communication signal converges to predetermined amplitudes at the symbol timing. FIG. 4 is a schematic diagram of the eye pattern of an absolute value signal of a 16-QAM communication signal. In this manner, in 16-level QAM, the amplitude converges to two amplitude values at the symbol timing.

Accordingly, symbol timing is detected by detecting a time with a high frequency of detection of the same amplitude.

Moreover, the multilevel QAM symbol timing detector of this invention, utilizes an I signal and a Q signal, respectively, for the multilevel QAM communication signal detected using an oversampling frequency with a predetermined factor, generates a histogram of amplitude data for each sampling time using the I signal along with generating a histogram of amplitude data for each sampling time using the Q signal, and detects symbol timing based on the histograms of amplitude data for the I signal and histograms of amplitude data for the Q signal.

This arrangement makes use of the fact that a multilevel QAM communication signal is composed of an I signal and Q signal to generate the above-described histograms for the I signal and Q signal. Here, since symbol timing is the same for both I signal and Q signal, the detected symbol timing should be the same even if the histograms of the respective signals are summed up. Therefore, the number of amplitude samples for each sampling time is essentially doubled and the accuracy of detection is improved by summing these histograms.

In addition, along with comprising the above-described multilevel QAM symbol timing detector, the multilevel QAM communication signal receiver of this invention comprises samplers for down-sampling the multilevel QAM communication signal using the symbol timing signal outputted from the multilevel QAM symbol timing detector, and a baseband demodulator for demodulating the baseband multilevel QAM signal sampled by the samplers.

In this arrangement, information is reliably demodulated through downsampling and baseband demodulation of the received multilevel QAM communication signal using the symbol timing detected in the above-described manner.

EFFECTS OF THE INVENTION

This invention permits detection of symbol timing based on a received multilevel QAM communication signal alone. Namely, it makes it possible to design a multilevel QAM symbol timing detector detecting symbol timing easily and reliably without using reference signals or setting suitable threshold values in the conventional manner.

Moreover, this invention makes it possible to design a multilevel QAM communication signal receiver reliably demodulating information transmitted via multilevel QAM modulation by providing this multilevel QAM symbol timing detector.

DESCRIPTION OF REFERENCE NUMERALS

1, 2: Mixers; 3: $\pi/2$ Phase Shifter; 4, 5: Low-Pass Filters LPF; 6: Symbol Timing Detector; 7a,7b: Down Samplers; 8: Demodulator; 610: I-Signal Histogram Generator; 620: Q-Signal Histogram Generator; 611,621: Absolute-Value Operators; 612, 622: Timing-Amplitude Extractors; 613, 623: One-Symbol Length Buffers: 614a-614n, 624a-624n: Timing-Amplitude Buffers; 615a-615n, 625a-625n: Amplitude Histogram Generators; 630: Symbol Timing Estimator; 640: Histogram Data Adder; 641a-641n: Adders.

BEST MODE FOR CARRYING OUT THE INVENTION

The multilevel QAM symbol timing detector used in an embodiment of the present invention will be explained with reference to FIG. 1 to FIG. 3. In the present embodiment, explanations will be provided regarding a 16-level QAM symbol timing signal detector utilizing a 16-level QAM modulated signal as a multilevel QAM modulated signal.

Figure 1:
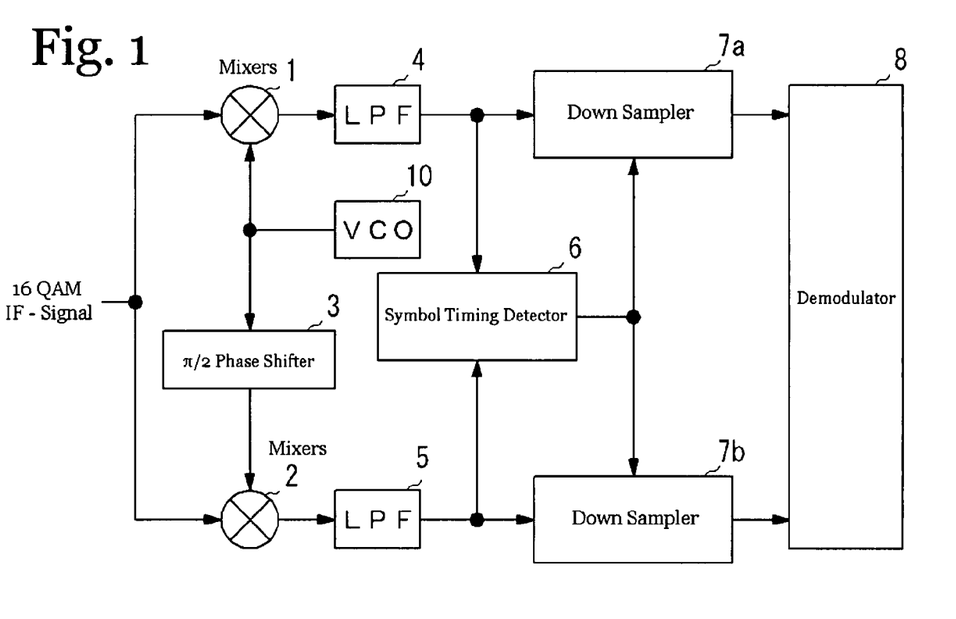
FIG. 1 is a block diagram illustrating a schematic configuration of a multilevel QAM symbol timing detector used in an embodiment of the present invention.

FIG. 1 is a block diagram illustrating a schematic configuration of a 16-level QAM communication signal receiver comprising the symbol timing detector used in the present embodiment.

Figure 2:
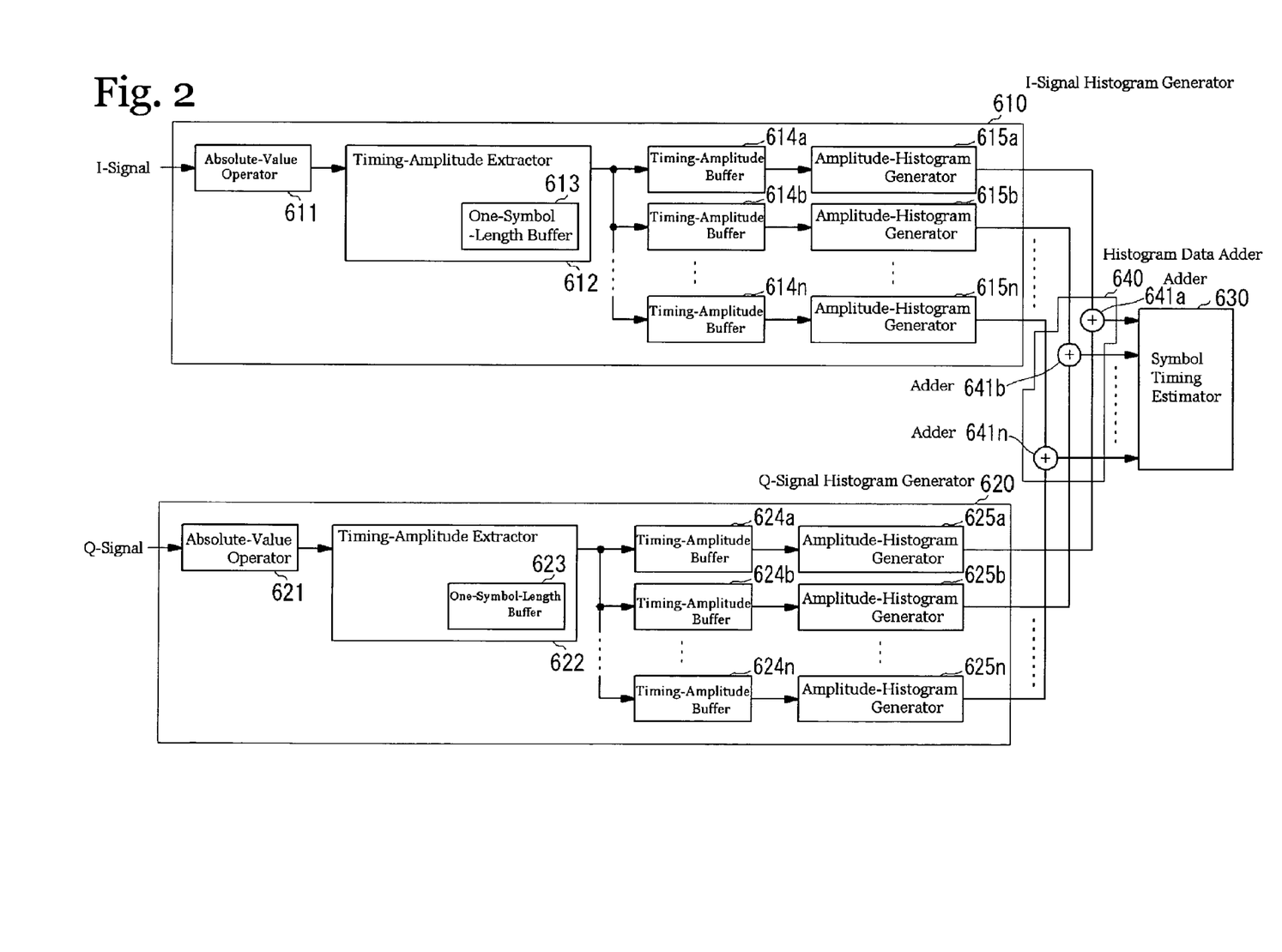
FIG. 2 is a block diagram illustrating a schematic configuration of the symbol timing detector illustrated in FIG. 1.

FIG. 2 is a block diagram illustrating a schematic configuration of the symbol timing detector illustrated in FIG. 1.

The 16-level QAM communication signal receiver comprises Mixers 1 and 2, $\pi/2$ Phase Shifter 3, LPFs 4 and 5, Symbol Timing Detector 6, Down Samplers 7a and 7b, and Demodulator 8.

A received 16-QAM modulated RF communication signal is down-converted to an intermediate frequency to yield a 16-QAM IF signal, which is distributed between and inputted to Mixer 1 and Mixer 2.

Based on phase difference information obtained using, for instance, a Costas loop circuit (not shown) comprising Voltage Controlled Oscillator (VCO) 10, VCO 10 generates a local oscillator signal of a predetermined frequency such that an I signal and a Q signal of a predetermined oversampling frequency are outputted from Mixers 1 and 2, and inputs it to $\pi/2$ Phase Shifter 3 along with inputting it to Mixer 1. The $\pi/2$ Phase Shifter 3 shifts (delays) the phase of the inputted local oscillator signal by $\pi/2$ and inputs it to Mixer 2.

By quadrature-modulating the inputted 16-level QAM IF signal with the local oscillator signal from VCO 10, Mixer 1 produces an I signal of a predetermined oversampling frequency (hereinafter referred to simply as "oversampling I signal") and inputs it to Low-Pass Filter (LPF) 4. LPF 4 removes unwanted harmonic components contained in the oversampling I signal and inputs it to Symbol Timing Detector 6 along with inputting it to Down Sampler 7*a*.

In addition, by quadrature-modulating the inputted 16-level QAM IF signal with the π/2 phase controlled local oscillator signal, Mixer 2 produces a Q signal of a predetermined oversampling frequency (hereinafter referred to simply as "oversampling Q signal") and inputs it to low-pass filter (LPF) 5. LPF 5 removes unwanted harmonic components contained in the oversampling Q signal and inputs it to Symbol Timing Detector 6 along with inputting it to Down Sampler 7*b*.

Symbol Timing Detector 6, which is constituted by hardware or software that implements the configuration illustrated in FIG. 2, uses the hereinafter described method to detect symbol timing based on the inputted oversampling I signal and oversampling Q signal and inputs the symbol timing signal to Down Samplers 7*a*, 7*b*.

Along with synchronizing the oversampling I signal inputted from LPF 4 to the symbol timing signal outputted from Symbol Timing Detector 6, Down Sampler 7*a* performs downsampling and inputs baseband I signal sampling data to Demodulator 8. In addition, along with synchronizing the oversampling Q signal inputted from LPF 5 to the symbol timing signal outputted from Symbol Timing Detector 6, Down Sampler 7*b* performs downsampling at a predetermined sampling cycle and inputs baseband Q signal sampling data to Demodulator 8. Down Samplers 7*a*, 7*b* herein correspond to the "Samplers" of the present invention.

Demodulator 8 demodulates information configured via 16-value QAM modulation by well-known methods using sampling data for the inputted baseband I signal and sampling data for the baseband Q signal. Demodulator 8 herein corresponds to the "Baseband Demodulator" of the present invention.

The configuration of Symbol Timing Detector 6 will be explained more specifically next.

As shown in FIG. 2, the Symbol Timing Detector 6 comprises I-Signal Histogram Generator 610, Q-Signal Histogram Generator 620, Histogram Data Adder 640, and Symbol Timing Estimator 630.

I-Signal Histogram Generator 61*o* comprises Absolute-Value Operator 611, Timing-Amplitude Extractor 612, One-Symbol Length Buffer 613, Timing-Amplitude Buffers 614*a*-614*n*, and Amplitude Histogram Generators 615*a*-615*n*. Q-Signal Histogram Generator 620 comprises Absolute-Value Operator 621, One-Symbol Length Buffer 622, Timing-Amplitude Extractor 623, Timing-Amplitude Buffers 624*a*-624*n*, and Amplitude Histogram Generators 625*a*-625*n*. Here, Timing-Amplitude Extractors 612, 622 correspond to the "Sampling Point Amplitude Detectors" of the present invention, Timing-Amplitude Buffers 614*a*-614*n* and 624*a*-624*n* correspond to the "Sampling Timing-dedicated Amplitude Data Buffers" of the present invention, and Amplitude Histogram Generators 615*a*-615*n* and 625*a*-625*n* correspond to the "Amplitude Histogram Generators" of the present invention.

The content of processing by I-Signal Histogram Generator 610 and Q-Signal Histogram Generator 620 is explained below. It should be noted that the only difference between I-Signal Histogram Generator 610 and Q-Signal Histogram Generator 620 is that the signals processed are either I signals or Q signals while signal processing is substantially the same, the explanations of which are omitted. At such time, Absolute Value Operator 611 corresponds to Absolute Value Operator 621 and Timing Amplitude Extractor 612 corresponds to Timing Amplitude Extractor 622. Furthermore, One-Symbol-Length Buffer 613 corresponds to One-Symbol-Length Buffer 623, Timing-Amplitude Buffers 614*a*-614*n* respectively correspond to Timing-Amplitude Buffers 624*a*-624*n*, and Amplitude Histogram Generators 615*a*-615*n* correspond to Amplitude Histogram Generators 625*a*-625*n*.

When the oversampling I signal is inputted to Absolute-Value Operator 611 of I-Signal Histogram Generator 610, Absolute-Value Operator 611 computes absolute values for the inputted oversampling I signal and inputs an absolute value signal to Timing-Amplitude Extractor 612.

Timing Amplitude Extractor 612 buffers sampling times for the oversampling I signal and amplitude data for these times in One-Symbol-Length Buffer 613 for each 1-symbol length time interval. After the sampling times and amplitude data have been buffered in One-Symbol-Length Buffer 613 for a single symbol length, Timing Amplitude Extractor 612 inputs timing numbers corresponding to each sampling time and amplitude data corresponding to these numbers to Timing-Amplitude Buffers 614*a*-614*n*. Whenever a sampling time is acquired, the timing numbers herein are successively updated and, after 1 symbol length has been updated, they are initialized and updating of timing numbers is repeated in a similar manner. In other words, the same timing numbers are outputted for each single symbol period.

Timing-Amplitude Buffers 614*a*-614*n* respectively buffer amplitude data for various specific timing numbers. Therefore, the number of Timing-Amplitude Buffers 614*a*-614*n* provided is obtained by dividing a 1-symbol-length period by the period of the oversampling frequency. Stated otherwise, e.g. nine timing amplitude buffers are provided in case of 9-fold oversampling.

After these Timing-Amplitude Buffers 614*a*-614*n* have buffered the respective predetermined number of amplitude data elements, these amplitude data elements are inputted to the respective Amplitude Histogram Generators 615*a*-615*n*. The number of buffered amplitude data elements herein, i.e. the duration of received signals used in the construction of the histograms (which corresponds to the "predetermined interval" of the present invention) may be appropriately set in such a manner that, in the hereinafter described Symbol Timing Estimator 630, symbol timing is discernible from other sampling times. Stated otherwise, if there is a lot of noise and symbol timing is difficult to detect, the predetermined interval is lengthened, and if there is little noise and symbol timing is easy to detect, the predetermined interval is shortened.

Amplitude Histogram Generators 615*a*-615*n* generate histograms of the inputted amplitude data, i.e. calculate the frequencies of occurrence of each amplitude data element and output them to Histogram Data Adder 640.

Such generation of amplitude data histograms for each sampling time is also done for the oversampling Q signal.

Histograms of amplitude data outputted from each Amplitude Histogram Generator 615*a*-615*n* for the oversampling I signal and histograms of amplitude data outputted from each Amplitude Histogram Generator 625*a*-625*n* for the oversampling Q signal are inputted to Histogram Data Adder 640, summed up in respective Adders 641*a*-641*n* provided for each sampling time and inputted to Symbol Timing Estimator 630.

Figure 3:
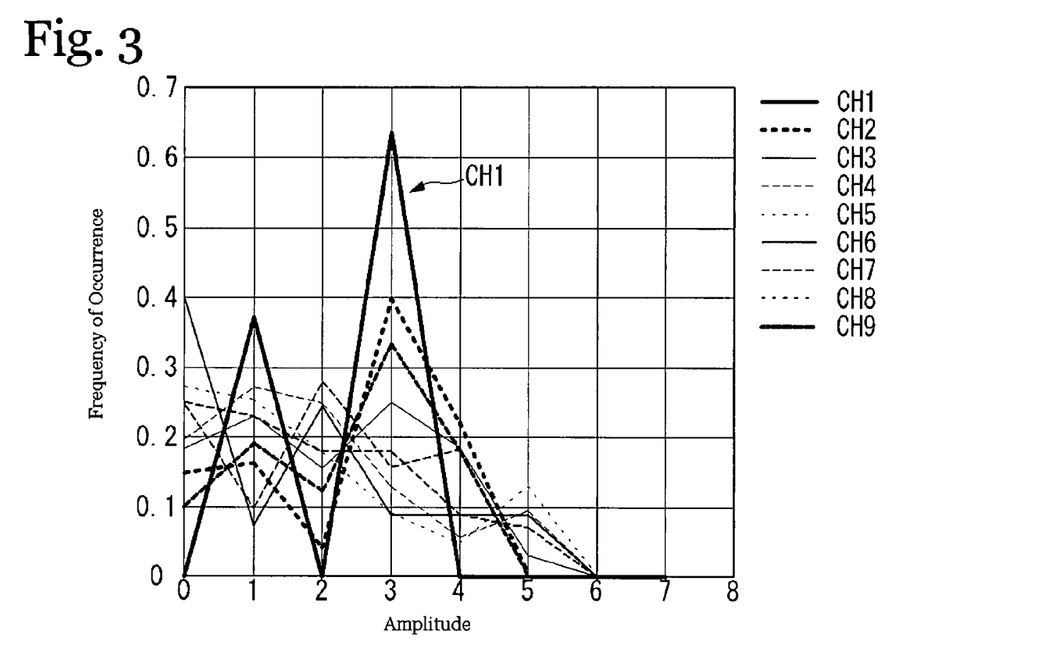
FIG. 3 is a diagram illustrating an integrated histogram of amplitude data.

Symbol Timing Estimator 630 integrates the inputted histograms of amplitude data for each sampling time and generates an integrated histogram of amplitude data such as the one illustrated in FIG. 3.

FIG. 3 is a diagram illustrating the integrated histogram of amplitude data. It should be noted that FIG. 3 illustrates results obtained using 9-fold oversampling, i.e. using 9 sampling points, and performing sampling by subdividing amplitude data resolution into 8 stages including amplitude "0". Moreover, it shows results, in which the number of samples m at each sampling time is 32. In addition, sampling timing numbers CH1-CH9 are arranged chronologically in this order.

In the results illustrated in FIG. 3, the frequency of occurrence of amplitude "3" at the sampling timing number CH1 is higher than the frequency of occurrence of specific amplitudes at sampling timing numbers CH2-CH9. Moreover, in a similar manner, the frequency of occurrence of amplitude "1" at sampling timing number CH1 is higher than the frequency of occurrence of amplitude "1" at sampling timing numbers CH2-CH9.

The characteristic used here is the frequency of occurrence of amplitude data for each sampling time and, as described above, since amplitude data is practically the same at the symbol timing, the frequency of occurrence of data with the same amplitude is higher than for other sampling times.

Accordingly, symbol timing can be detected by detecting a sampling time with a high frequency of occurrence of the same amplitude data.

When Symbol Timing Detector 6 detects symbol timing, it generates a symbol timing signal and inputs it, as described above, to Down Samplers 7*a*, 7*b*.

By using this arrangement, symbol timing can be detected without using unique words UW or pilot symbols PS. In addition, at such time, there is no need for presetting threshold values and reference signals for symbol timing detection in advance and symbol timing can be detected in an easy and reliable manner.

Moreover, providing such a symbol timing detector makes it possible to design a 16-QAM communication signal receiver that reliably demodulates 16-level QAM communication signals.

It should be noted that while the explanations above described 16-level QAM communication signals, the invention is not limited to 16-level QAM and the above-described arrangement can be used and the above-described effects can be obtained in case of any multilevel QAM wherein square constellations are used in data mapping.

In addition, although in the explanations above the histograms were generated using I signals and Q signals, histograms may be generated using only I signals or only Q signals. However, using both I signals and Q signals provides for a higher accuracy of detection of symbol timing than in case of using only one signal because the number of samples is doubled.

Also, as explained above, accuracy can be improved by lengthening the duration of sampling. However, by using the method described below, accuracy (sensitivity) can be improved without lengthening the overall duration of sampling.

In this case, when amplitude data for each sampling time are buffered using Timing Amplitude Extractors 612 and 622, previously buffered 1-symbol-length data and currently buffered 1-symbol-length data are partially duplicated. By performing such processing, the quantity of sampling times and amplitude data inputted to Timing-Amplitude Buffers 614*a*-614*n* and 624*a*-624*n* is increased. In other words, the number of samples can be increased and sensitivity can be improved without changing the overall sampling time.

The invention claimed is:

1. A multilevel QAM symbol timing detector for detecting symbol timing of a multilevel QAM communication signal, and a multilevel QAM communication signal receiver, comprising:
    sampling point amplitude detectors for buffering the amplitude data of the multilevel QAM communication signal detected using an oversampling frequency with a predetermined factor in 1-symbol period units and detecting amplitude data for each sampling time corresponding to the oversampling frequency;
    sampling timing-dedicated amplitude data buffers for buffering respective amplitude data corresponding to each sampling time within the 1-symbol period over predetermined intervals;
    amplitude histogram generators for generating histograms of amplitude data within the predetermined intervals, stored in each of the sampling timing-dedicated amplitude data buffers;
    a symbol timing detector for detecting, as symbol timing, a sampling time corresponding to the amplitude data with the highest detection frequency based on the results of the amplitude histogram generators;
    samplers for down-sampling the multilevel QAM communication signal using the symbol timing signal outputted from the multilevel QAM symbol timing detector; and
    a baseband demodulator for demodulating a baseband multilevel QAM signal sampled by the samplers.

2. The multilevel QAM symbol timing detector according to claim 1, comprising:
    absolute value operators for producing an absolute value signal by computing absolute values for the multilevel QAM communication signal detected using an oversampling frequency with a predetermined factor,
    wherein the sampling point amplitude detectors detect amplitude data using the absolute value signal of the multilevel QAM communication signal.

3. A multilevel QAM symbol timing detector for detecting symbol timing of a multilevel QAM communication signal, and a multilevel QAM communication signal receiver, comprising:
    sampling point amplitude detectors for buffering the amplitude data of the multilevel QAM communication signal detected using an oversampling frequency with a predetermined factor in 1-symbol period units and detecting amplitude data for each sampling time corresponding to the oversampling frequency;
    sampling timing-dedicated amplitude data buffers for buffering respective amplitude data corresponding to each sampling time within the 1-symbol period over predetermined intervals;
    amplitude histogram generators for generating histograms of amplitude data within the predetermined intervals, stored in each of the sampling timing-dedicated amplitude data buffers;
    a symbol timing detector for detecting, as symbol timing, a sampling time corresponding to the amplitude data with the highest detection frequency based on the results of the amplitude histogram generators;
    samplers for down-sampling the multilevel QAM communication signal using the symbol timing signal outputted from the multilevel QAM symbol timing detector; and
    a baseband demodulator for demodulating a baseband multilevel QAM signal sampled by the samplers;
    wherein the multilevel QAM symbol timing detector utilizes an I signal and a Q signal, respectively, for the multilevel QAM communication signal detected using an oversampling frequency with a predetermined factor, generates amplitude histograms for each sampling time using the I signal along with generating amplitude histograms for each sampling time using the Q signal, and detects the symbol timing based on the amplitude histograms for the I signal and amplitude histograms for the Q signal.

4. A multilevel QAM symbol timing detector for detecting symbol timing of a multilevel QAM communication signal, and a multilevel QAM communication signal receiver, comprising:

sampling point amplitude detectors for buffering the amplitude data of the multilevel QAM communication signal detected using an oversampling frequency with a predetermined factor in 1-symbol period units and detecting amplitude data for each sampling time corresponding to the oversampling frequency;

sampling timing-dedicated amplitude data buffers for buffering respective amplitude data corresponding to each sampling time within the 1-symbol period over predetermined intervals;

amplitude histogram generators for generating histograms of amplitude data within the predetermined intervals, stored in each of the sampling timing-dedicated amplitude data buffers;

a symbol timing detector for detecting, as symbol timing, a sampling time corresponding to the amplitude data with the highest detection frequency based on the results of the amplitude histogram generators;

absolute value operators for producing an absolute value signal by computing absolute values for the multilevel QAM communication signal detected using an oversampling frequency with a predetermined factor;

samplers for down-sampling the multilevel QAM communication signal using the symbol timing signal outputted from the multilevel QAM symbol timing detector; and a baseband demodulator for demodulating a baseband multilevel QAM signal sampled by the samplers;

wherein the sampling point amplitude detectors detect amplitude data using the absolute value signal of the multilevel QAM communication signal; and wherein the multilevel QAM symbol timing detector utilizes an I signal and a Q signal, respectively, for the multilevel QAM communication signal detected using an oversampling frequency with a predetermined factor, generates amplitude histograms for each sampling time using the I signal along with generating amplitude histograms for each sampling time using the Q signal, and detects the symbol timing based on the amplitude histograms for the I signal and amplitude histograms for the Q signal.

* * * * *